(12) United States Patent
Ivarsson et al.

(10) Patent No.: US 11,570,370 B2
(45) Date of Patent: Jan. 31, 2023

(54) METHOD AND SYSTEM FOR CONTROLLING AN EYE TRACKING SYSTEM

(71) Applicant: Tobii AB, Danderyd (SE)

(72) Inventors: Magnus Ivarsson, Danderyd (SE); Niklas Ollesson, Danderyd (SE); Viktor Åberg, Danderyd (SE); Anna Redz, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/039,970

(22) Filed: Sep. 30, 2020

(65) Prior Publication Data

US 2021/0099631 A1    Apr. 1, 2021

(30) Foreign Application Priority Data

Sep. 30, 2019   (SE) .................................... 1951110-4

(51) Int. Cl.
*H04N 5/235* (2006.01)
*G06V 10/22* (2022.01)
(Continued)

(52) U.S. Cl.
CPC ......... *H04N 5/2352* (2013.01); *G06V 10/143* (2022.01); *G06V 10/22* (2022.01); *G06V 40/19* (2022.01)

(58) Field of Classification Search
CPC ............. H04N 5/2352; H04N 5/23219; G06K 9/2018; G06K 9/2054; G06K 9/00604; G06K 9/2027; G06K 9/00597
See application file for complete search history.

(56) References Cited

U.S. PATENT DOCUMENTS

| 10,324,529 B1 | 6/2019 | Rana et al. |
| 2015/0199559 A1 | 7/2015 | Sztuk et al. |

(Continued)

FOREIGN PATENT DOCUMENTS

| WO | 2019028152 A1 | 2/2019 |
| WO | 2019129353 A1 | 7/2019 |

OTHER PUBLICATIONS

SE1951110-4, "Search Report", dated Jul. 3, 2020, 3 pages.

*Primary Examiner* — Tat C Chio
(74) *Attorney, Agent, or Firm* — Kilpatrick Townsend & Stockton LLP (57) ABSTRACT

There is provided a method, system, and non-transitory computer-readable storage medium for controlling an eye tracking system (200) to obtain a first image (500) captured under active illumination by at least one infrared, IR, illuminator (112, 113) associated with the eye tracking system (200) and at a current exposure setting, using the image sensor device (110); and, if at least one eye (100, 120) is depicted in the first image (500): define at least one region of interest, ROI, (501, 502, 503, 504) from the first image (500) comprising a group of pixels in the first image (500) representing at least a part of the depicted at least one eye (100, 120); determine a respective intensity value for each of the at least one ROI (501, 502, 503, 504); determine a second exposure setting by adjusting at least one exposure parameter of the image sensor device (110) based on the determined intensity value, or values, for the at least one ROI (501, 502, 503, 504); and set the current exposure setting to the second exposure setting.

18 Claims, 5 Drawing Sheets

(51) Int. Cl.
*G06V 10/143* (2022.01)
*G06V 40/19* (2022.01)

(56) References Cited

U.S. PATENT DOCUMENTS

| | | |
|---|---|---|
| 2017/0272768 A1 | 9/2017 | Tall et al. |
| 2018/0008141 A1 | 1/2018 | Krueger |
| 2018/0270436 A1* | 9/2018 | Ivarsson ................. G06F 3/012 |
| 2019/0141264 A1* | 5/2019 | Kang ................. G06K 9/00845 |
| 2019/0171006 A1 | 6/2019 | Aleem et al. |
| 2019/0179409 A1 | 6/2019 | Jones et al. |

* cited by examiner

METHOD AND SYSTEM FOR CONTROLLING AN EYE TRACKING SYSTEM

TECHNICAL FIELD

The present disclosure generally relates to the field of eye tracking. In particular, the present disclosure relates to controlling an eye tracking system to achieve reliable eye detection in images captured by an image sensor device associated with the eye tracking system.

BACKGROUND

Several different eye tracking systems are known in the art. Such systems may for example be employed to allow a user to indicate a location at a computer display by looking at that point. The eye tracking system may capture images of the user's face, and then employ image processing to extract key features from the user's face, such as a pupil center and glints from illuminators illuminating the user's face. The extracted features may then be employed to determine where at the display the user is looking. Naturally, factors such as accuracy, speed, and reliability/robustness of the eye tracking are desirable to achieve a positive user experience. Therefore, several schemes have been proposed for mitigating the negative effects of different types of errors or inaccuracies that may occur in eye tracking systems.

When performing eye tracking, the first step is to determine the position of one or both eyes in the image. Determination of eye position may be done using image processing methods, using a neural network trained on similar images, a combination of the two, or any other suitable eye detection method known in the art. Irrespective of which eye detection method is used, the accuracy of the result will at least in part depend on the quality of the images in which the eye detection is performed. Of course, if the eye tracking system cannot perform eye detection reliably, it will not be possible to perform robust eye tracking, and the user experience will be suffering.

Hence, there is a need for solutions that aim at optimizing the images captured by an image sensor associated with an eye tracking system for eye tracking purposes.

It would therefore be desirable to provide further systems and methods addressing this issue.

SUMMARY

An object of the present disclosure is to address at least one of the issues described above.

One important factor in capturing images that are to be subjected to eye detection is the exposure of the image, wherein an over-exposed or under-exposed image may lead to the eye detection algorithm, neural network, or the like not being able to distinguish an eye present in the image from its surroundings. Therefore, in order to improve the reliability and accuracy of an eye tracking system, and hence improve the user experience, it is important that the image sensor(s) of the eye tracking system captures well-exposed images, i.e. not too saturated images or too dark images.

Even though numerous solutions exist for controlling exposure and other parameters for image sensor devices in general, typically used to obtain improved image quality, none of these aim to control an image sensor of associated with an eye tracking system with the aim of capturing images optimized for eye tracking.

When applying an exposure control algorithm based on an entire image, there's a substantive risk that one or more parts of the image will still end up too dark or too bright/saturated. If an eye is comprised in such a part of the image, the eye may consequently be saturated, over-exposed, or under-exposed even after exposure control has been applied. In other words, if exposure control is based anything but the image parts comprising an eye or eyes and its immediate surroundings, the result will, as exemplified herein in connection with the figures, be inferior with regard to eye detection and eye tracking purposes.

The inventors have therefore realized that what is needed to ensure more reliable eye tracking performance is an eye based exposure control applied to the image sensor device of the eye tracking system that captures images for eye detection and further processing within the eye tracking system. An exposure control based solely on the eye region/eye area according to embodiments herein suitably adapt and optimize the image sensor device exposure settings such that the eye of the user of the eye tracking system will be well exposed in subsequent images captured by the image sensor device, regardless of the quality of the remaining parts of the captured image. Thereby, reliable eye detection is enabled. Since the only part of these images that is of interest for eye detection and eye tracking purposes is the eye are/eye region, the loss of information in other parts of the image is of no importance. Also, the captured images are not intended to be viewed by a human observer, whereby the visually perceived quality is irrelevant.

A further object is to provide improved control of an eye tracking system in order to optimize its performance, i.e. the eye tracking result, under different lighting conditions. This is suitable achieved by embodiments presented herein as all embodiments improve the exposure settings to optimize the exposure of the eye region/eye area under the current light conditions. Furthermore, embodiments herein wherein the exposure control is performed repeatedly suitably provide continuous adaptation of the exposure settings to the current light conditions.

According to a first aspect, the objects are achieved by a method for controlling the exposure settings of an image sensor device associated with an eye tracking system to enable eye tracking, the image sensor device being sensitive to IR light, wherein the method comprises: obtaining, in the eye tracking system, a first image captured under active illumination by at least one infrared, IR, illuminator associated with the eye tracking system and at a current exposure setting, using the image sensor device and determining, using processing circuitry comprised in the eye tracking system, if at least one eye is depicted in the first image by detecting in the first image at least a part of an eye illuminated by IR light from the at least one IR illuminator. The at least one part of an eye comprises at least one glint, at least one pupil, a part of at least one iris, a part of at least one sclera, and/or a part of at least one eye lid. If at least one eye is depicted in the first image, the method further comprises defining, using the processing circuitry, at least one region of interest, ROI, from the first image comprising a group of pixels in the first image representing at least a part of the depicted at least one eye; determining, using the processing circuitry, an intensity value for the at least one ROI based on intensity values of the group of pixels representing at least a part of the eye; determining a second exposure setting by adjusting, using the processing circuitry, at least one exposure parameter of the image sensor device based on the determined intensity value of the at least one ROI; and setting, using the processing circuitry, the current exposure setting to the second exposure setting.

Suitably, the exposure settings of an image sensor device are thereby optimized specifically for improved eye detection capabilities in subsequent images captured using the updated exposure setting with regards to the light conditions in which the eye tracking system operates, making the eye detection more reliable irrespective of the ambient light conditions. Thereby, embodiments presented herein further optimize the eye tracking performance of the eye tracking system with regards to the light conditions in which the eye tracking system operates, making the eye tracking or gaze tracking performance more reliable irrespective of the ambient light conditions.

The method steps may be performed repeatedly, thereby advantageously providing continuous optimization of the exposure settings of an image sensor device for eye detection in subsequently captured images.

Detecting in the first image, using the processing circuitry, at least a part of an eye may comprise detecting at least one glint caused by IR light from the at least one IR illuminator or at least one pupil illuminated by IR light from the at least one IR illuminator.

In some embodiments, defining, using the processing circuitry, at least one region of interest from the first image may comprise defining a first region of interest, ROI, for a first eye depicted in the first image and a second region of interest, ROI, for a second eye depicted in the first image.

The intensity value of the at least one ROI may be determined by applying a histogram to the intensity values of all or a selection of the pixels in the group of pixels representing the at least a part of the depicted eye, or the at least a part of each of the depicted eye.

In one or more embodiment, determining if at least one eye is depicted in a first image comprises detecting, using the processing circuitry, pixels representing a glint or at least a part of one or more of the iris, the pupil, the sclera, or the eye lid of the at least one eye.

The at least one exposure parameter of the image sensor device may in different embodiments comprise gain, exposure time, illumination time, skipping and/or binning and the method may comprise adjusting a selection of any or all of these exposure parameters in manners described herein.

The method may further comprise, after setting the current exposure setting to the second exposure setting, obtaining, using the image sensor device, a second image captured using the image sensor device, the image being captured under active illumination by at least one infrared, IR, illuminator associated with the eye tracking system, and in some embodiments further performing eye detection based on the second image, using the eye tracking system.

According to a second aspect, the objects are achieved by an eye tracking system, the system comprising an image sensor device being sensitive to IR light and processing circuitry configured to control the exposure settings of the image sensor device, by obtaining a first image captured under active illumination by at least one infrared, IR, illuminator associated with the eye tracking system and at a current exposure setting, using the image sensor device and determining if at least one eye is depicted in the first image. Determining if at least one eye is depicted in the first image comprises detecting in the first image at least a part of an eye illuminated by IR light from the at least one IR illuminator, wherein said at least one part of an eye comprises at least one glint, at least one pupil, a part of at least one iris, a part of at least one sclera, and/or a part of at least one eye lid. If at least one eye is depicted in the first image, the method comprises defining at least one region of interest, ROI, from the first image comprising a group of pixels in the first image representing at least a part of the depicted at least one eye; determining an intensity value for the at least one ROI based on intensity values of the group of pixels representing the at least a part of the at least one eye; determining a second exposure setting by adjusting at least one exposure parameter of the image sensor device based on the determined intensity value for the at least one ROI; and setting the current exposure setting to the second exposure setting.

The processing circuitry may be configured to control the exposure settings of the image sensor device repeatedly.

The processing circuitry may be configured to detect in the first image at least a part of an eye by detecting at least one glint caused by IR light from the at least one IR illuminator or at least one pupil illuminated by IR light from the at least one IR illuminator.

The processing circuitry may be configured to define a first region of interest, ROI, for a first eye depicted in the first image and a second region of interest, ROI, for a second eye depicted in the first image.

In some embodiments, the processing circuitry may be configured to determine the intensity value for the ROI by applying a histogram to the intensity values of all or a selection of the pixels in the group of pixels representing the at least a part of the depicted eye, or the at least a part each of the depicted eyes.

In one or more embodiments, the processing circuitry may be configured to determine if at least one eye is depicted in a first image by detecting pixels representing a glint or at least a part of one or more of the iris, the pupil, the sclera, or the eye lid of the at least one eye.

The at least one exposure parameter of the image sensor device may in different embodiments comprise gain, exposure time, illumination time, skipping and/or binning and the processing circuitry may be configured to adjust a selection of any or all of these exposure parameters in manners described herein.

The processing circuitry may further be configured to, after setting the current exposure setting to the second exposure setting, obtain a second image captured using the image sensor device, the image being captured under active illumination by at least one infrared, IR, illuminator associated with the eye tracking system and in some embodiments further to perform eye detection based on the second image, using the eye tracking system.

According to a third aspect, the objects are achieved by a non-transitory computer-readable storage medium storing instructions which, when executed by processing circuitry of a system, cause the system to perform the method steps of any of the appended method claims.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In the following, example embodiments will be described in greater detail with reference to the accompanying drawings, in which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Embodiments of the present disclosure aim at solving, or at least ameliorating, the ensuing problem of how to control an image sensor associated with an eye tracking system to capture images optimized for eye detection and eye tracking.

Solutions to the problems are provided by the embodiments described herein, in the description and the appended claims.

Advantageously, embodiments presented herein optimize the exposure settings of an image sensor device specifically for improved eye detection capabilities in subsequent images captured using the updated exposure setting with regards to the light conditions in which the eye tracking system operates, making the eye detection more reliable irrespective of the ambient light conditions. Thereby, embodiments presented herein further optimize the eye tracking performance of the eye tracking system with regards to the light conditions in which the eye tracking system operates, making the eye tracking or gaze tracking performance more reliable irrespective of the ambient light conditions.

One clear advantage of the eye tracking controlling according to embodiments herein is thus that the presented solutions for controlling an eye tracking system are specifically adapted to enable eye detection, irrespective of any other information that the processed images may comprise. Furthermore, the human perceived visual result of the image is of no importance, since the image is only used within the eye tracking system, for eye tracking purposes, and not intended to be viewed by a human observer. For these reasons, no regard has to be taken to preserving or improving quality or information in parts of the image that do not comprise information that the eye tracking system requires for eye detection. In other words, the only part(s) of the image that is interesting is the part(s) relating to the eye(s) of a user of the eye tracking system.

One or more embodiments described herein comprises continuously controlling the eye tracking system by repeatedly updating the exposure settings of the image sensor device(s) of the eye tracking system, thereby continuously optimizing the exposure settings of the image sensor device for eye detection with regards to the light conditions in which the eye tracking system operates, and continuously making the eye detection more reliable irrespective of the ambient light conditions. Consequently, the eye tracking performance of the eye tracking system is continuously optimized to the light conditions in which the eye tracking system currently operates, making the eye tracking or gaze tracking performance more reliable irrespective of the ambient light conditions.

A further advantage that follows from the above is that the visual result and user experience for a user of the eye tracking system is improved when the eye tracking or gaze tracking result becomes more reliable.

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The term eye tracking as used herein may be understood as comprising any of: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking.

Any embodiment described herein as referring to one eye, for instance a first eye, of a user is of course equally applicable to any of the user's eyes, and may also be performed for both the eyes of a user in parallel, or consecutively.

Throughout the present disclosure, the term obtaining information may be understood as receiving information, in a push fashion, and/or retrieving information, in a pull fashion. As a specific example, obtaining an image may in the context of this description be understood as: capturing an image, using for example an image sensor device 110; receiving an image, for example from an imaging device, which may be the image sensor device 110, or from a memory; or retrieving an image, for example from an imaging device, which may be the image sensor device 110, or from a memory.

Methods, systems and associated storage media for controlling an eye tracking system will be described below with reference to FIGS. 1-10. First, an illustrative example of an eye will be described with reference to FIGS. 1 and 4.

Figure 1:
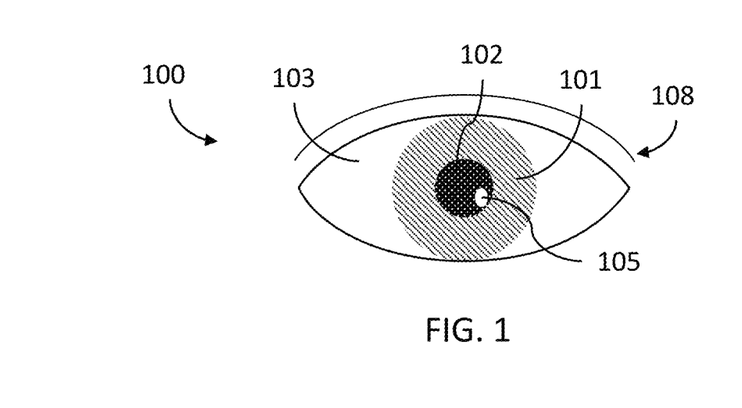
FIG. 1 is a front view of an eye.
Figure 4:
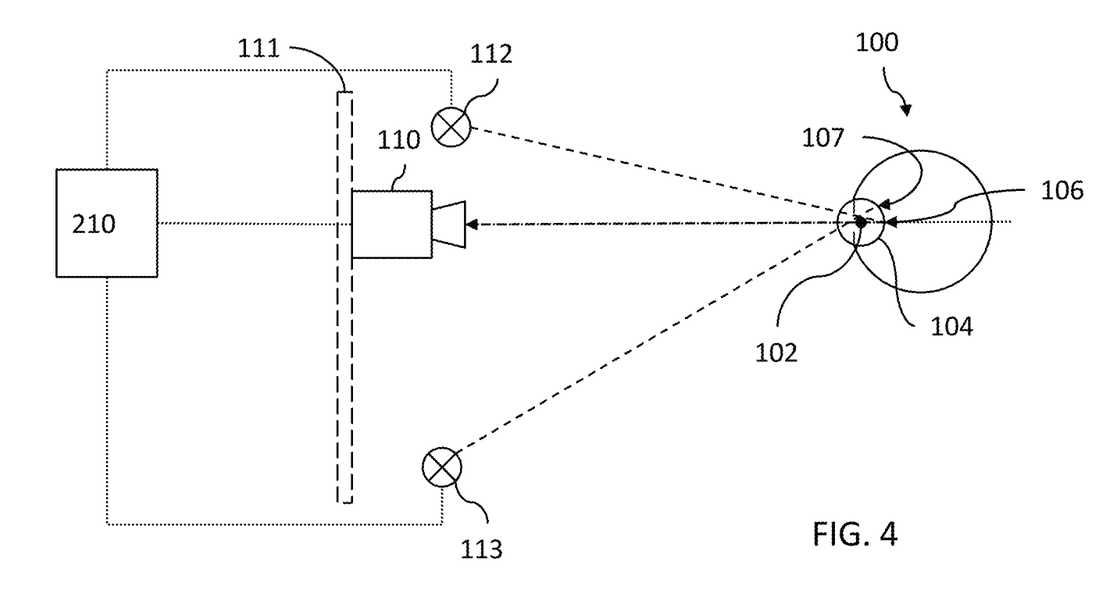
FIG. 4 shows a schematic overview of an eye of a user and components of an eye tracking system, according to one or more embodiments.

FIG. 1 is a front view of an eye 100. FIG. 4 comprises a cross sectional view of the eye 100 from the side of the eye 100. While FIG. 4 shows more or less the entire eye 100, the front view presented in FIG. 1 only shows those parts of the eye 100 which are typically visible from in front of a person's face. As shown in FIG. 1, the eye 100 has a sclera 103 and a cornea 104 through which an iris 101 and a pupil 102 are visible in the front view. In FIG. 1, a glint 105 is shown, caused by a reflection 106, 107 of light emitted by an illuminator 112, 113 and reflected from the cornea 104 of the eye 100, as schematically illustrated in FIG. 4. The eye 100 further comprises an eye lid 108. The light emitted by the illuminator 112, 113 towards the eye 100 is in one or more embodiments light in the infrared frequency band, or in the near infrared frequency (NIR) band.

System Architecture

System embodiments will now be described with reference to FIGS. 2, 3 and 4.

Figure 2:
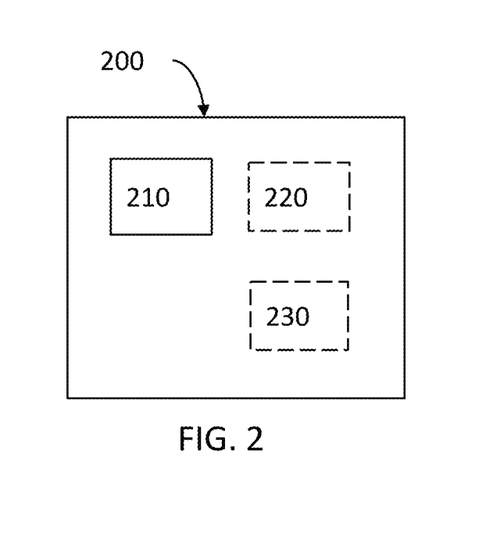
FIG. 2 shows a schematic overview of an eye tracking system, according to one or more embodiments.
Figure 3:
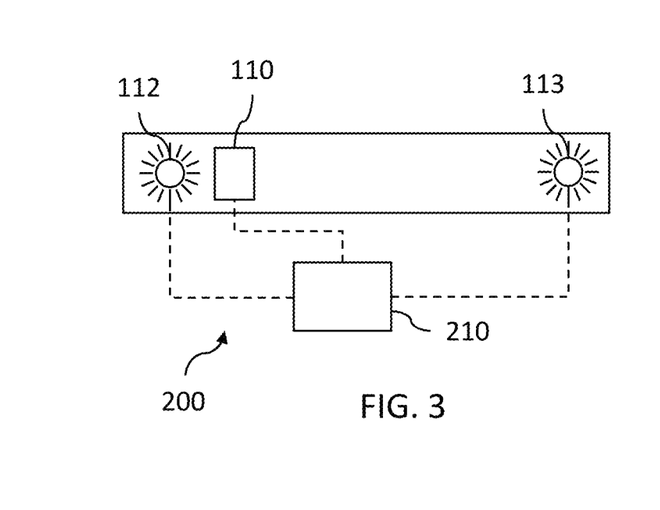
FIG. 3 shows a schematic overview of an eye tracking system, according to one or more embodiments.

FIGS. 2 and 3 are schematic overviews of an eye tracking system 200 comprising eye tracking equipment 220, and processing circuitry 210, according to one or more embodiments. FIG. 4 shows a schematic overview of an eye 100 of a user and components of an eye tracking system 200 comprising eye tracking equipment 220, and processing circuitry 210.

Turning first to FIGS. 2 and 3, there is schematically shown an eye tracking system 200 comprising an image sensor device 110, comprising a plurality of pixels, and processing circuitry 210 configured to control the image sensor device 110 according to embodiments described herein. The image sensor device 110 is sensitive to infrared, IR, light. In one or more embodiments, the image sensor device 110 may further be sensitive to visible light radiation.

The eye tracking system 200 can also be used for eye tracking or gaze tracking. The image sensor device 110 is configured to capture images of one or both eyes of a user of the eye tracking system 200 based on which eye tracking may be performed.

According to some embodiments, the eye tracking system 200 may comprise at least one illuminator for illuminating the eyes. The eye tracking system 200 (which may also be referred to as a gaze tracking system), according to an embodiment comprises, or is connected to or associated with, one or more illuminator 112 and/or one or more illuminator 113, for illuminating the eyes of a user.

The illuminator 112 and the illuminator 113 may each be light emitting diodes emitting light in the infrared frequency band, or in the near infrared frequency (NIR) band, i.e. a near infrared (NIR) diode. The terms illuminator and diode may be understood as comprising a single illuminator or diode, or alternatively as comprising a group of two or more illuminators or diodes that are arranged very closely together and controlled to act as a single light source, i.e. which are controlled to operate such that they together cause a single glint when illuminated.

Figure 5:
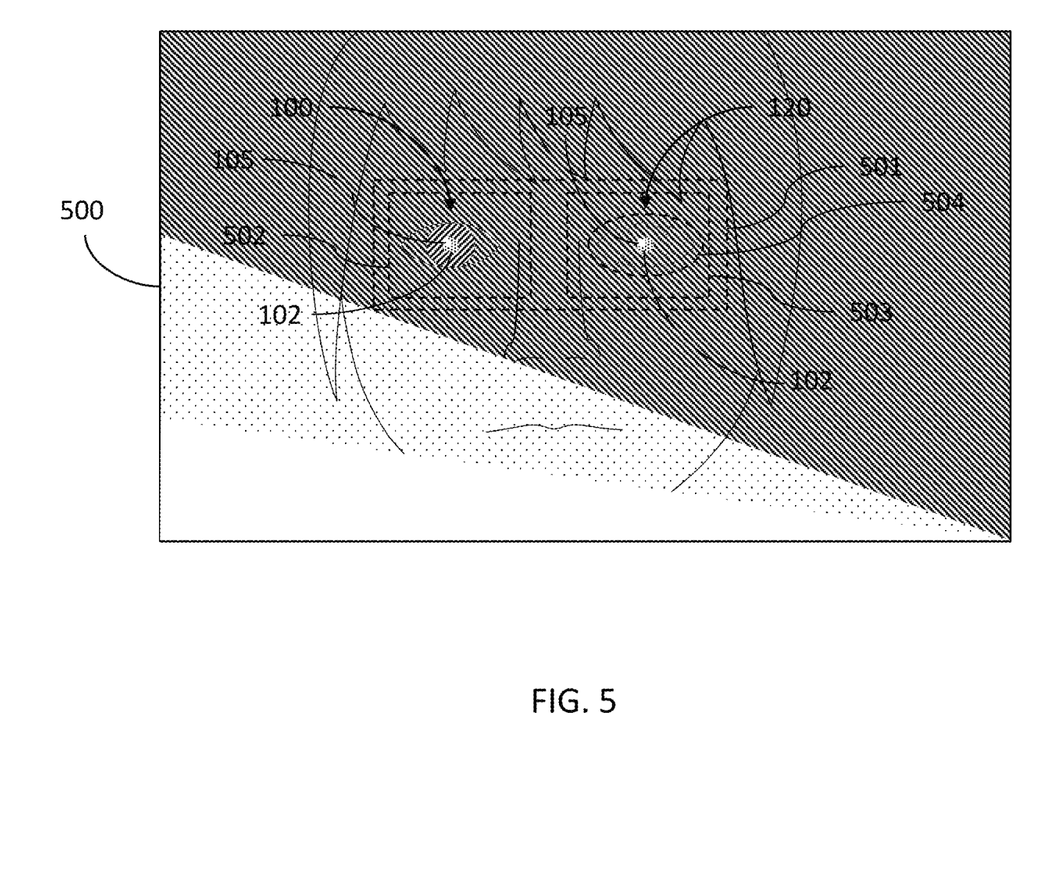
FIG. 5 shows an example of an image captured without the use of exposure control according to embodiments presented herein.

Preferably, the illuminator 112 is a bright pupil (BP) diode arranged coaxially with (or close to) the camera 110, or other imaging sensor 110, so that the camera 110 may capture bright pupil images of the user's eyes, if the illuminator 112 emits light at, or close to, its maximum power. In this case, due to the coaxial arrangement of the illuminator 112 and the camera, or other imaging sensor, 110, light reflected from the retina of an eye 100, at point 106, returns back out through the pupil 102 towards the camera 110, so that the pupil 102 appears brighter than the iris 101 surrounding it in images where the illuminator 112 illuminates the eye. Thereby, the eye tracking system 200 is configured to obtain BP images of the user's eye 100. In FIG. 5, a non-limiting example of a BP image is shown, wherein each pupil 102 is caused by the in-falling and reflected light from the illuminator 112 to appear brighter than their respective surrounding iris in the captured image 500.

The optional one or more second illuminator 113 may be arranged non-coaxially with (or further away from) the camera 110 for capturing dark pupil (DP) images (not shown in the figures). Due to the non-coaxial arrangement of the one or more second illuminator 113 and the camera 110, light reflected from the retina of an eye 100, at point 107, does not reach the camera 110 and the pupil appears darker than the iris surrounding it in images where a second illuminator 113 illuminates the eye.

The image sensor device 110 may for example be a camera, such as a complementary metal oxide semiconductor (CMOS) camera or a charged coupled device (CCD) camera. Hereinafter, the image sensor device 110 may be referred to as a camera 110.

FIG. 4 also shows, for purpose of understanding, a screen 111 towards which the user eye 100 is gazing. The display 111 may for example be a liquid-crystal display (LCD) or a LED display. However, other types of displays may also be envisaged. The display may for example be flat or curved. The display 111 may for example be placed in front of one of the user's eyes.

In one or more embodiment, the processing circuitry 210 of the eye tracking system 200 is configured to control the exposure settings of the image sensor device 110, by obtaining a first image 500 captured under active illumination by at least one infrared, IR, illuminator 112, 113 associated with the eye tracking system 200 and at a current exposure setting, using the image sensor device 110; and determining, using processing circuitry 210 comprised in the eye tracking system 200, if at least one eye 100, 120 is depicted in the first image 500. Determining if at least one eye 100, 120 is depicted in the first image 500 comprises detecting in the first image 500 at least a part of an eye 100, 120 illuminated by IR light from the at least one IR illuminator 112, 113, wherein said at least a part of an eye comprises at least one glint 105, at least one pupil 102, a part of at least one iris 101, a part of at least one sclera 103, and/or a part of at least one eye lid 108. If at least one eye 100, 120 is depicted in the first image 500 the processing circuitry 210 is further configured to define at least one region of interest, ROI, 501, 502, 503, 504 from the first image 500 comprising a group of pixels in the first image 500 representing at least a part of the depicted at least one eye 100, 120; determine a respective intensity value for each of the at least one ROI 501, 502, 503, 504 based on intensity values of the group of pixels representing the at least a part of the depicted at least one eye 100, 120; and determining a second exposure setting by adjusting at least one exposure parameter of the image sensor device 110 based on the determined intensity value, or values, of the at least one ROI 501, 502, 503, 504. Thereafter, the processing circuitry 210 is configured to set the current exposure setting to the second exposure setting.

The processing circuitry 210 is in one or more embodiment configured to control the exposure settings of the image sensor device 110 continuously, by being configured to performing the above described actions repeatedly.

In some embodiments, wherein a first eye 100 and a second eye 120 have been determined to be depicted in the first image 500, the processing circuitry 210 may be configured to define a first region of interest, ROI, 502 for the first eye 100 and a second region of interest, ROI, 503 for the second eye 120.

In some embodiments, the processing circuitry 210 is configured to determine the respective intensity value for each of the at least one ROI 501, 502, 503, 504 based on intensity values of the group of pixels of each ROI, representing the depicted eye 100, or eyes 100, 120, by applying a histogram to the intensity values of all or a selection of the pixels in the ROI; or by calculating an average or median value the intensity values of all or a selection of the pixels in the ROI; or by determining a minimum or maximum value among the intensity values of all or a selection of the pixels in the ROI; or by applying a combination of any or all of these methods, and other known, suitable, methods.

The processing circuitry 210 may be configured to determine if at least one eye 100, 120 is depicted in a first image 500 by detecting pixels representing a glint 105, and/or at least a part of one or more of the iris 101, the pupil 102, the sclera 103, or the eye lid 108 of the at least one eye 100, 120. The processing circuitry may be configured to perform the detection by detecting one or more preset pattern or mapping one or more predetermined shape to a look-up table. Alternatively, or in combination, the processing circuitry may be configured to perform the detection by employing a pre-trained machine learning algorithm configured to identify one or more of a glint 105, or at least a part of an iris 101, a pupil 102, a sclera 103, or an eye lid of a depicted eye.

As a non-limiting illustrative example of determine if at least one eye 100, 120 is depicted in a first image 500 by detecting, in this example by performing pupil detection, the processing circuitry 210 of a remote eye tracking system 200 may be configured to employ a pre-trained machine learning algorithm to determine a position of a pupil of a depicted eye. Alternatively, or as a second refinement step of this non-limiting illustrative example, the processing circuitry 210 may be configured to perform image processing to identify a circle or ellipse in the image, possibly coinciding with or being closely located to the determined position of the pupil if this has previously been determined. Optionally, the processing circuitry 210 may in this example further be configured to define a pupil center and/or a pupil border.

In some embodiments, the processing circuitry 210 may be configured to detect in the first image 500 the at least a part of an eye by detecting at least one glint 105 caused by IR light from the at least one IR illuminator 112, 113. Alternatively, or in combination, the processing circuitry 210 may be configured to detect in the first image 500 the at least a part of an eye by detecting at least one pupil 102 illuminated by IR light from the at least one IR illuminator 112, 113. This may comprise detecting a bright pupil or a dark pupil in the first image 500, in manners known in the art. The at least one exposure parameter of the image sensor device 110 may comprise gain, wherein the processing circuitry 210 may suitably be configured to adjust the at least one exposure parameter by applying a gain to be multiplied to the pixel intensity values of images captured using the image sensor device 110. Alternatively, or in combination, the at least one exposure parameter of the image sensor device 110 may comprise exposure time and wherein the processing circuitry 210 may suitably configured to adjust the at least one exposure parameter by adjusting the exposure time to be applied when capturing images using the image sensor device 110. Alternatively, or in combination, the at least one exposure parameter of the image sensor device 110 may comprise skipping or binning and wherein the processing circuitry 210 is configured to adjust the at least one exposure parameter by adjusting a skipping or binning read-out scheme for the image sensor device 110.

Figures 6, 7, 8:
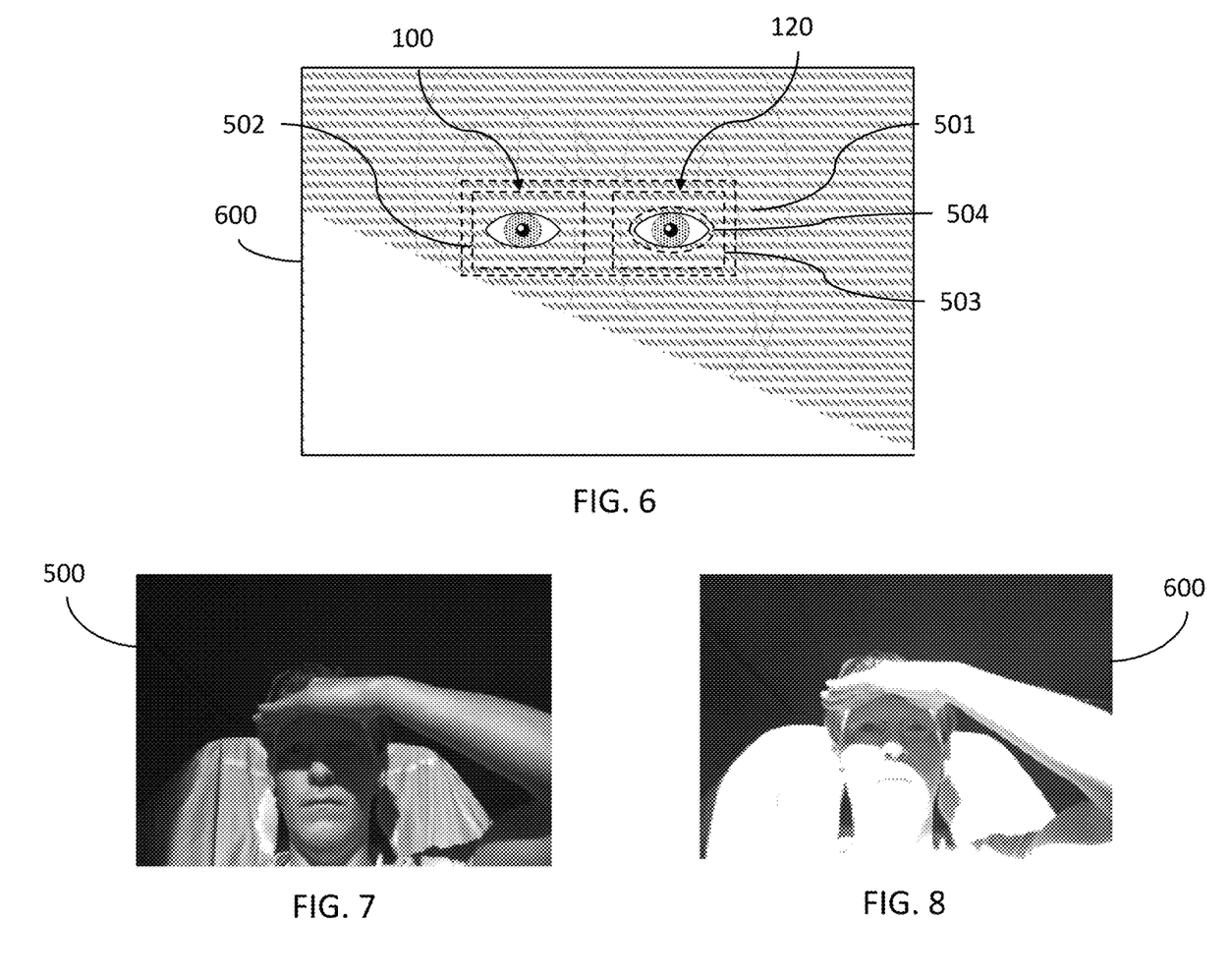
FIG. 6 shows an example of the image of FIG. 5 captured after applying the exposure control according to one or more embodiments presented herein.
FIG. 7 shows an example of an image captured without the use of exposure control according to embodiments presented herein.
FIG. 8 shows an example of an image similar to that of FIG. 7 captured after applying the exposure control according to one or more embodiments presented herein.

After setting the current exposure setting to the second exposure setting, the processing circuitry 210 may further be configured to obtain a second image 600 captured using the image sensor device 110, the image being captured under active illumination by at least one infrared, IR, illuminator 112, 113 associated with the eye tracking system 200.

In one or more embodiments, the processing circuitry 210 may further be configured to perform eye detection based on the second image 600, using the eye tracking system 200.

The pixels of the captured images may in some embodiments be read from the image sensor device 110 using pixel binning and/or pixel skipping. Pixel binning is a technique according to which a number of adjacent pixels in a binning region are read simultaneously. The resulting intensity value for the binning region is an average of the individual pixel values comprised in the binning region. Pixel skipping is a technique according to which only one pixel of out a number of adjacent pixels in a skipping region is read while the other pixels in the skipping region are not read. The intensity value for the skipping region is in this case the pixel value of the pixel that is read out. When increasing the level of binning and/or skipping the readout time is decreased, leading to a reduction in exposure time. This is useful when the ambient light increases, for example in a case when the image sensor device 110 is moved outdoors and some of the pixels might be saturated. In other situations, it may also be of interest to decrease the level of skipping and/or binning in order to raise the exposure of the pixels when the ambient light intensity decreases, such as for example when the image sensor device 110 is moved from outdoors to indoors. In one or more embodiments described herein, adjustment of pixel binning and/or pixel skipping may be used for exposure control.

The processing circuitry 210 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories 140. Such a memory 230 may for example be comprised in the system 200, or may be external to (for example located remotely from) the system 200. The memory 230 may store instructions for causing the system 200 to perform a method according to any of the embodiments presented in connection with FIG. 2.

The processing circuitry 210 may in one or more embodiment be configured to perform any or all of the method embodiments described in connection with FIG. 4.

It will be appreciated that the system 200 embodiments described above with reference to FIGS. 2 and 3 is provided as examples, and that many other systems may be envisaged. For example, the system 200 may consist only of the processing circuitry 210.

Method Embodiments

In the following, method embodiments will be described in connection with FIGS. 9 and 10, with reference to FIGS. 5, 6, 7 and 8.

Figure 9:
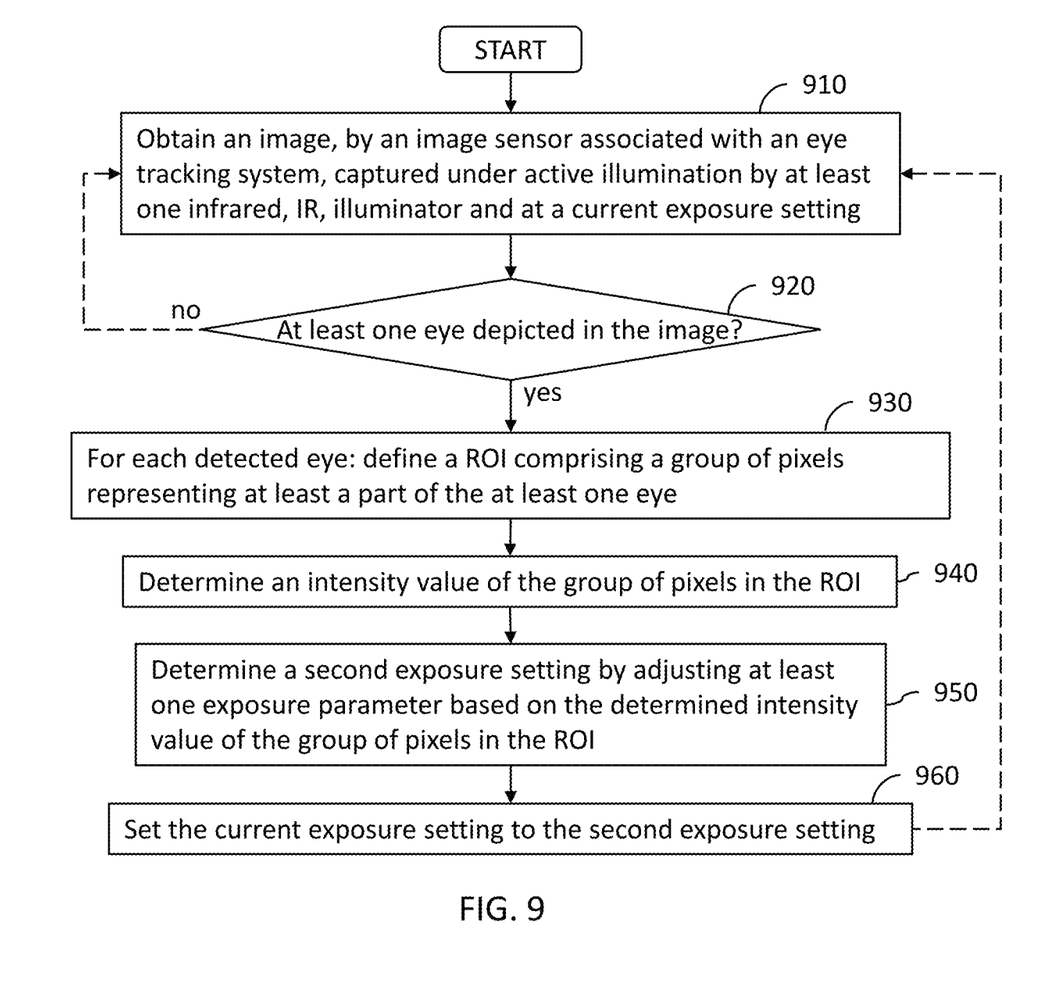
FIG. 9 is a flow chart of a method according to or more embodiments.

Turning now to FIG. 9, there is shown a flow chart presenting embodiments of a computer implemented method for controlling the exposure settings of an image sensor device 110 associated with an eye tracking system 200 to enable eye tracking, the image sensor device 110 being sensitive to IR light, the method comprising:

In step 910: obtaining, in the eye tracking system 200, a first image 500 captured using the image sensor device 110 associated with the eye tracking system 200 under active illumination by at least one infrared, IR, illuminator 112, 113 associated with the eye tracking system 200 and at a current exposure setting.

The image sensor device 110 may also be sensitive to visible light.

In FIG. 5, an exemplary first image 500 captured using the image sensor device 110 associated with the eye tracking system 200 is shown. As can be seen from FIG. 5, the first image 500 in this example depicts at least part of a face of a user of the eye tracking system 200. In the exemplary first image 500 illustrated in FIG. 5, the eyes 100, 120 of the user are in shadow and hard to distinguish from the surrounding areas in the image, and it appears impossible to for example reliably detect a pupil, since there is no visible contrast, or pixel intensity difference, between pixels representing the pupil and the iris of each eye 100, 120, respectively. This is an example of how an image captured by the image sensor device 110 may look if the exposure settings of the image sensor device 110 are not optimized for eye detection. In the exemplary first image 500 of FIG. 5, the mouth of the user is clearly distinguishable, but this is of no interest in the current case, because detecting a user's mouth does not contribute to solving the problem of how to enable the eye tracking system 200 to perform reliable eye detection, and hence reliable eye tracking.

Another exemplary illustration of a first image 500 captured using exposure settings that are not optimized for eye detection is shown in FIG. 7. The image of FIG. 7 has been captured using an image sensor device 110 associated with an eye tracking system 200 after the exposure parameters have been adapted to optimize the exposure based on the full face of the depicted user, to show that face based auto exposure methods do not provide a satisfactory result when it comes to solving the problem of how to enable the eye tracking system 200 to perform reliable eye detection, and hence reliable eye tracking. It is evident from the first image 500 shown in FIG. 7 that the image comprises the parts of a person, being the user of the eye tracking system 200, with a clearly visible mouth and chin as a result of the face based auto exposure being applied. However, the person's eyes, which are the only parts of the image that are of interest for eye detection purposes, are not clearly visible, but are underexposed in this example. The contrast of the respective area around each eye therefor has low contrasts between different parts of the eye and its immediate surroundings, comprising very little pixel intensity information. In an image wherein the contrasts or pixel intensity information of the eye area(s) are this low, it will be very hard to perform reliable eye detection and subsequent eye tracking, or gaze tracking, by the eye tracking system 200. Consequently, the exposure parameters of the image sensor device 110 will need to be adjusted in this case, using embodiments presented herein.

In step 920: determining, using the processing circuitry 210, if at least one eye 100, 120 is depicted in the first image 500, wherein determining if at least one eye 100, 120 is depicted in the first image 500 comprises detecting in the first image 500 at least a part of an eye illuminated by IR light from the at least one IR illuminator 112, 113.

The at least a part of an eye to be detected comprises at least one glint 105, at least one pupil 102, a part of at least one iris 101, a part of at least one sclera 103, and/or a part of at least one eye lid 108.

In one or more embodiments the determining, using the processing circuitry 210, if at least one eye 100, 120 is depicted in the first image 500 may include performing eye detection to detect at least one eye 100, 120 depicted in the first image 500. The eye detection may in these embodiments be performed in any suitable manner known in the art of eye tracking, based on preset rules and conditions.

In one or more embodiments the determining, using the processing circuitry 210, if at least one eye 100, 120 is depicted in the first image 500 may be done using machine learning or artificial intelligence (AI) algorithms, wherein the machine learning or AI system has been trained to, and is configured to, recognize eyes depicted in images similar to the first image 500 captured by the image sensor device 110 in step 910.

In one or more embodiments, determining, using the processing circuitry 210, if at least one eye 100, 120 is depicted in the first image 500 may include performing image analysis on the first image 500, for example to detect contrasts, contours, and/or shapes etc.

In one or more embodiments, determining, using the processing circuitry 210, if at least one eye 100, 120 is depicted in the first image 500 may include performing detection of one or more eye related feature, for example an eye brow or a part of the bridge of a nose, and making an experience based guess on the position of an eye in relation to the one or more detected eye related feature. The detection of the one or more features may in this case be based on analysis and/or processing of the first image, for example by performing pattern recognition, wherein the patterns are generated to represent the shape, size and/or intensity distribution etc. of the respective eye related feature.

Using active illumination obtained by at least one illuminator 112, 113, in manners known in the art of eye tracking, and using an image sensor device that is sensitive to IR light, one or more glints 105 caused by the IR light from the at least one infrared, IR, illuminator 112, 113 and/or one or more bright or dark pupil may be detectable for each eye present in images captured using the image sensor device 110. Thereby, the determining, using the processing circuitry 210, if at least one eye 100, 120 is depicted in the first image 500 may comprise, alternative to or in combination with any of the other embodiments described under step 920, detecting any glint 105, bright pupil or dark pupil present in the first image 500. In other words, detecting in the first image 500, using the processing circuitry 210, at least a part of an eye may comprise detecting at least one glint 105 caused by IR light from the at least one IR illuminator 112, 113 or at least one pupil 102 illuminated by IR light from the at least one IR illuminator 112, 113. The glint detection and/or detection of bright or dark pupil may be performed in any manner known in the art. If at least one glint 105, bright pupil or dark pupil is detected in the first image 500 it may hence be determined that at least one eye 100, 120 is depicted in the first image 500. Suitably, thereby further possible manners of determining if at least one eye 100, 120 is depicted in the first image 500 is thereby provided, making the determination even more reliable. Furthermore, the fact that the glint 105, bright pupil and dark pupil are all caused by active illumination by an IR illuminator 112, 113, the IR light of which is detectable by the image sensor device 110, advantageously makes these manners of determination more independent of the ambient light conditions, thereby further contributing to the reliability of the determination of step 920.

In one or more embodiments, determining, using the processing circuitry 210, if at least one eye 100, 120 is depicted in the first image 500 may include performing detecting, using the processing circuitry 210, one or more pixels representing at least one of at least one glint, at least a part of an iris 101, at least a part of a pupil 102, at least a part of a sclera 103 and/or at least a part of an eye lid 108 of each of at least one depicted eye 100, 120.

Of course, a suitable combination of any or all of the embodiments described under step 920 may be used.

If it is determined that at least one eye 100, 120 is depicted in the first image 500 the method continues in step 930.

If it is determined that no eye is depicted in the first image 500 the method returns to step 910.

In step 930: defining, using the processing circuitry 210, at least one region of interest, ROI, 501, 502, 503, 504 from the first image 500 comprising a group of pixels in the first image 500 representing at least a part of the depicted at least one eye 100, 120.

Each of the at least one ROI 501, 502, 503, 504, respectively, may have any suitable size and shape, as long as it includes the at least a part of the depicted at least one eye 100, 120.

In some embodiments, each of the at least one ROI, respectively, may be defined as an area (rectangular or otherwise suitably shaped) enclosing at least a part of a single eye 100, 120. Examples of such ROIs are illustrated in FIGS. 5 and 6 as ROIs 502 and 503. Another non-limiting suitable shape is an ellipse, as illustrated by the ROI 504 in FIGS. 5 and 6.

In other embodiments, wherein two eyes 100, 120 have been determined to be depicted in the first image 500, a ROI may be defined as an area (rectangular or otherwise suitably shaped) enclosing at least part of both eyes 100 and 120. Examples of such a ROI are illustrated in FIGS. 5 and 6 as ROI 501. The method may in these embodiments comprise defining, using the processing circuitry 210, a first region of interest, ROI, 502 for a first eye 100 depicted in the first image 500 and a second region of interest, ROI, 503 for a second eye 120 depicted in the first image 500.

In some embodiments the size and shape of each respective ROI 501, 502, 503, 504 may be defined to also comprise one or more eye related feature, which is herein defined as a part of the image which represents a distinguishable part of the user's face that is located very close to or immediately surrounding an eye 100, 120, for example including a part of the nose bridge, an eye brow, or a part of an eyebrow.

In one or more embodiments, each of the at least one ROI 501, 502, 503, 504 is selected such that it comprises only pixels that represent a part of an eye 100, 120 or an eye related feature. Of course, the selected shape of a ROI may lead to a number of additional pixels that are in direct connection with the eye 100, 120 or the eye related feature also being comprised in the ROI. However, it is desirable that the amount of pixels representing image parts that are not an eye part or an eye related feature are kept at a minimum, since the eye based auto exposure solution described herein will perform better the more focused the ROI is on only eye parts, and possibly eye related features.

As an example, if a selected ROI were to comprise a major part of, or the entire, face of a depicted user, the optimization towards enabling reliable eye detection would not work sufficiently well. This is for example illustrated by the exemplary first image 500 shown in FIG. 7, wherein a full face auto exposure method has been applied, and wherein the result is an image wherein the eyes are not well exposed and eye detection cannot reliably be performed.

As descried herein, step 930 may comprise defining, using the processing circuitry 210, a first region of interest, ROI, 502 for a first eye 100 depicted in the first image 500 and a second region of interest, ROI, 503 for a second eye 120 depicted in the first image 500. The first and second ROI 502, 503 may in these embodiments be further processed either separately in the subsequent method step, or combined into a combined ROI before the method continues in step 940.

Preferably, each ROI 502, 503, 504 comprises the first or second eye 100, 120 and its immediate surroundings, or correspondingly each ROI 501 comprises the first and second eyes 100, 120 and its immediate surroundings, so that the pixels of the respective ROI that represents the at least part of the eye, or eyes, 100, 120 constitute more than 30% of the pixels in the ROI, or more than 20% of the pixels in the ROI, or at least more than 15% of the pixels in the ROI.

In step 940: determining, using the processing circuitry 210, a respective intensity value for the at least one ROI 501, 502, 503, 504 based on intensity values of the group of pixels in the ROI.

The intensity value may also be referred to as a brightness level or an exposure value, and is based on the intensities of the pixels in the ROI 501, 502, 503, 504.

The intensity value of each of the at least one ROI 501, 502, 503, 504, respectively, based on intensity values of the group of pixels in the ROI, may be determined by applying a histogram to the intensity values of all or a selection of the pixels in the group of pixels in the ROI. Alternatively, or in combination, the intensity value of each of the at least one ROI 501, 502, 503, 504, respectively, based on intensity values of the group of pixels in the ROI, may be determined by calculating an average or median value of the intensity values of all or a selection of the pixels in the group of pixels in the ROI. Alternatively, or in combination, the intensity value may be determined as a minimum or maximum value among the intensity values of all or a selection of the pixels in the group of pixels in the ROI. A suitable combination of any or all of these with other known methods may also be used, if suitable.

In step 950: determining a second exposure setting by adjusting, using the processing circuitry 210, at least one exposure parameter of the image sensor device 110 based on the determined intensity value, or values, of the group of pixels in the ROI.

In some embodiments, if the determined intensity value is greater than a first preset threshold value, the ROI is considered to be over-exposed. In this case, exposure control to reduce the intensity value of the group of pixels representing the depicted eye 100, or eyes 100, 120 in subsequently captured images is needed.

In some embodiments, if the determined intensity value is lower than a second preset threshold value, the ROI is considered to be under-exposed. In this case, exposure control to increase the intensity value of the group of pixels representing the depicted eye 100, or eyes 100, 120 in subsequently captured images is needed.

In some embodiments, the at least one exposure parameter of the image sensor device 110 may comprise gain, wherein adjusting the at least one exposure parameter, i.e. adjusting the gain, comprises applying a gain in the form of a multiplicative factor to be multiplied to the pixel intensity values of images subsequently captured using the image sensor device 110. For example, if the determined intensity value of the group of pixels representing the depicted eye is below a first threshold, indicating that the intensity is too low for the eye to be properly detectable by the eye tracking system 200, adjusting the at least one exposure parameter of the image sensor device 110 may comprise adjusting the gain to be higher than the previous set gain value. Similarly, if the determined intensity value of the group of pixels representing the depicted eye is above a second threshold, indicating that the intensity is too high for the eye to be properly detectable by the eye tracking system 200, adjusting the at least one exposure parameter of the image sensor device 110 may comprise adjusting the gain to be lower than the previous set gain value.

Alternatively, or in combination with a gain adjustment, the at least one exposure parameter may comprise exposure time, wherein adjusting the at least one exposure parameter, i.e. adjusting the exposure time, comprises adjusting the exposure time to be applied when capturing images using the image sensor device 110, to make the subsequently captured images appear brighter or darker, depending on which exposure problem is to be solved.

Alternatively, or in combination with a gain adjustment and/or adjustment of exposure time, the at least one exposure parameter may comprise illumination time, wherein adjusting the at least one exposure parameter, i.e. adjusting the illumination time, comprises adjusting the time that the one or more of the at least one illuminator 112, 113 is illuminated when capturing images using the image sensor device 110. By illuminating the one or more of the at least one illuminator 112, 113 during either the entire exposure time or during only part of the exposure time, illuminated features in the subsequently captured images may thereby suitably be caused to appear brighter or darker, depending on which exposure problem is to be solved.

Alternatively, or in combination with a gain adjustment and/or adjustment of exposure time and/or illumination time, the at least one exposure parameter may comprise skipping and/or binning. In these embodiments, adjusting the at least one exposure parameter may comprise adjusting a skipping and/or binning read-out scheme for the image sensor device 110.

Skipping and/or binning may typically be used for additional exposure control if gain and/or exposure time and/or illumination time have been adjusted to their respective maximum, or minimum, value, depending on which problem is to be solved, and the resulting image result is still not satisfactory for eye detection purposes.

In step 960: setting the current exposure setting to the second exposure setting.

Thereby, the method optimizes the exposure settings of the image sensor device 110 for eye detection, and hence optimizes the eye tracking performance of the eye tracking system 200, to the light conditions in which the eye tracking system 200 currently operates.

After setting the current exposure setting to the second exposure setting in step 960, the method may return to step 910, repeating the method of FIG. 9 and thereby continuously optimizing the exposure settings of the image sensor device 110 for eye detection, and hence continuously optimizing the eye tracking performance of the eye tracking system 200, to the light conditions in which the eye tracking system 200 currently operates.

In FIGS. 6 and 8, examples of images captured after the method according to embodiments herein has been applied are shown. As can be seen from the figures, the eye area/eye region in the images captured after the herein described eye based exposure control are much better exposed and comprise much more information that can be used for eye detection compared to the eye area/eye region in the example images of FIGS. 5 and 7, which were captured without the use of the inventive eye based exposure control.

As an illustrative example, if an exposure control method optimizing the exposure based on a larger part of the user's face in FIG. 5 had instead been used, for example a face based exposure control including the already well exposed chin and mouth area in FIG. 5, an image captured after applying the exposure control would not look very different to that of FIG. 5. The reason is that there are both over-exposed (saturated), well exposed and under-exposed (dark) parts of the face in FIG. 5.

Therefore, other methods using the entire face (or most of the face) as reference area (ROI) would not increase the exposure such that the chin and mouth part would become over-exposed as shown in FIGS. 6 and 8. The aim of such methods is to improve the exposure, and typically the visually perceivable result, of the entire face. Consequently, such methods will not provide exposure control that aim at exposing the eye area/eye region properly for eye detection in subsequently captured images. In other words, face-based exposure control solutions do not optimize the exposure settings for the purpose of achieving reliable eye detection. Therefore, the result of such methods will not solve the problem solved by the embodiments presented herein.

The method described in connection with FIG. 9 may further comprise, after setting the current exposure setting to the second exposure setting in step 970: obtaining, using the image sensor device 110, a second image 600 captured using the image sensor device 110, the image being captured under active illumination by at least one infrared, IR, illuminator 112, 113 associated with the eye tracking system 200.

The method may further comprise performing eye tracking based on the second image 600, using the eye tracking system 200. Two non-limiting examples of such a second image 600, captured after adjustment of one or more exposure parameter as described in connection with FIG. 9, are shown in FIGS. 6 and 8.

The processing circuitry 210 may suitably be configured to performing any or all of the method embodiments described in connection with FIG. 9.

Further Embodiments

In one or more embodiment, there is provided a non-transitory computer-readable storage medium storing instructions which, when executed by processing circuitry 210 of the system 200, cause the system 200 to perform the method as defined in any of the method embodiments disclosed herein (in other words, in the claims, the summary, or the detailed description).

The non-transitory computer-readable storage medium may store instructions which, when executed by processing circuitry 210 of the system 200, cause the system 200 to obtain a first image 500 captured under active illumination by at least one infrared, IR, illuminator 112, 113 associated with the eye tracking system 200 and at a current exposure setting, using the image sensor device 110; determine, using processing circuitry 210 comprised in the eye tracking system 200, if at least one eye 100, 120 is depicted in the first image 500, wherein determining if at least one eye 100, 120 is depicted in the first image 500 comprises detecting in the first image 500 at least one glint 105 caused by IR light from the at least one IR illuminator 112, 113. The non-transitory computer-readable storage medium may further store instructions which, when executed by processing circuitry 210 of the system 200, cause the system 200 to if at least one eye 100, 120 is depicted in the first image 500: define a region of interest, ROI, 501, 502, 503, 504 from the first image 500 comprising a group of pixels in the first image 500 representing at least a part of the iris and a part of the pupil of each of the depicted at least one eye 100, 120; determine an intensity value for the ROI 501, 502, 503, 504 based on intensity values of the group of pixels representing the at least a part of the iris and a part of the pupil of each of the depicted at least one eye 100, 120; and determine a second exposure setting by adjusting at least one exposure parameter of the image sensor device 110 based on the determined intensity value of the group of pixels representing the depicted eye 100, or eyes 100, 120. Thereafter, the non-transitory computer-readable storage medium may further store instructions which, when executed by processing circuitry 210 of the system 200, cause the system 200 to set the current exposure setting to the second exposure setting. In some embodiments, the non-transitory computer-readable storage medium may store instructions which, when executed by processing circuitry 210 of the system 200, cause the system 200 to perform the method repeatedly.

In one or more embodiments, the non-transitory computer-readable storage medium may further store instructions which, when executed by processing circuitry 210 of the system 200, cause the system 200 to perform the method defined in any of the method embodiments. In some embodiments, the non-transitory computer-readable storage medium may further store instructions which, when executed by processing circuitry 210 of the system 200, cause the system 200 to perform the method defined in any of the method embodiments repeatedly. Repeatedly may in this context be understood as being performed for every image frame captured by the image sensor device 110, at a preset time interval, for every second, third, fourth etc. captured image frame, or at another suitably selected preset interval.

The non-transitory computer-readable storage medium may for example be provided in a computer program product. In other words, a computer program product may for example comprise a non-transitory computer-readable storage medium storing instructions which, when executed by the processing circuitry 210 of the system 200, cause the system 200 to perform the method as defined in any of the method embodiments.

As described above with reference to FIG. 2, the storage medium need not necessarily be comprised in the system 200.

The person skilled in the art realizes that the present invention is by no means limited to the preferred embodiments described above. On the contrary, many modifications and variations are possible within the scope of the appended claims. For example, the method embodiments described above with reference to FIG. 9 may, as explained herein, be combined with additional method steps to form further embodiments. Further, it will be appreciated that the system 200 shown in FIG. 2 is merely intended as an example, and that other systems may also perform the methods described above with reference to FIG. 9.

It will be appreciated that the processing circuitry 210 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A computer implemented method for controlling the exposure setting of an image sensor device associated with an eye tracking system to enable eye tracking, the image sensor device being sensitive to IR light, wherein the method comprises:
   obtaining, in the eye tracking system, a first image, wherein the first image is captured under active illumination by at least one infrared, IR, illuminator associated with the eye tracking system and at a current exposure setting, using the image sensor device;
   determining, using processing circuitry comprised in the eye tracking system, if at least one eye is depicted in the first image, wherein determining if at least one eye is depicted in the first image comprises detecting in the first image at least part of an eye illuminated by IR light from the at least one IR illuminator, wherein said at least one part of an eye comprises at least one glint, at least one pupil, a part of at least one iris, a part of at least one sclera, or a part of at least one eye lid;
   if at least one eye is depicted in the first image;
   defining, using the processing circuitry, at least one region of interest, ROI, from the first image comprising a group of pixels in the first image representing at least a part of the depicted at least one eye;
   determining, using the processing circuitry, a respective intensity value for each of the at least one ROI based on intensity values of the group of pixels in the ROI;
   determining a second exposure setting by adjusting, using the processing circuitry, at least one exposure parameter of the image sensor device based on the determined intensity value, or values, of the at least one ROI; and
   setting, using the processing circuitry, the current, exposure setting to the second exposure setting;
   and further comprising:
   after setting the current exposure setting to the second exposure setting, obtaining, using the image sensor device, a second image captured using the image sensor device, the second image being captured under active illumination by at least one infrared, IR, illuminator associated with the eye tracking system;
   wherein the at least one IR illuminator is illuminated during an entire exposure time of the image sensor.

2. The method of claim 1, wherein detecting in the first image, using the processing circuitry, at least part of an eye comprises detecting at least one glint caused by IR light from the at least one IR illuminator or at least one pupil illuminated by IR light from the at least one IR illuminator.

3. The method of claim 1, wherein defining, using the processing circuitry, at least one region of interest from the first image comprises defining a first region of interest, ROI, for a first eye depicted in the first image and a second region of interest, ROI, for a second eye depicted in the first image.

4. The method of claim 1, wherein determining the respective intensity value of each of the at least one ROI comprises applying a histogram to the intensity values of all or a selection of the pixels in the ROI.

5. The method of claim 1, wherein deter lining if at least one eye is depicted in a first image comprises detecting, using the processing circuitry, pixel representing a glint or at least a part of one or more of the iris, the pupil, the sclera, or the eye lid of the least one eye.

6. The method of claim 1, wherein the at least one exposure parameter of the image sensor device comprises gain and wherein adjusting the at least, one exposure parameter comprises applying a gain to be multiplied to the pixel intensity values of images captured using the image sensor device.

7. The method of claim 1, wherein the at least one exposure parameter of the image sensor device comprises exposure time and wherein adjusting the at least one exposure parameter comprises adjusting the exposure time to be applied when capturing images using the image sensor device.

8. The method of claim 1, wherein the at least one exposure parameter of the image sensor device comprises skipping or binning and wherein adjusting the at least one exposure parameter comprises adjusting a skipping or binning read-out scheme for the image sensor device.

9. An eye tracking system, the system comprising an image sensor device being sensitive to IR light and processing circuitry, wherein the processing circuitry is configured to control the exposure setting of the image sensor device, by:
    obtaining a first image, wherein the first image is captured under active illumination by at least one infrared, IR, illuminator associated with the eye tracking system and at a current exposure setting, using the image sensor device;
    determining if at least one eye is depicted in the first image, wherein determining if at least one eye is depicted in the first image comprises detecting in the first image at least a part of an eye illuminated by 1R light from the at least one IR illuminator, wherein said at least one part of an eye comprises at least one dint, at least one pupil, a part of at least one iris, a part of at least one sclera, and/or a part of at least one eye lid;
    if at least one eye is depicted in the first image:
        defining at least one region of interest, ROI, from the first image comprising a group of pixels in the first image representing at least a part of the depicted at least one eye;
        determining a respective intensity value for each of the at least one ROI based on intensity values of the group of pixels in the ROI; and
        determining a second exposure setting by adjusting at least one exposure parameter of the image sensor device based on the determined intensity value, or values, for the at least one ROI; and
        setting the current exposure setting to the second exposure setting;
    and further comprising:
        after setting the current exposure setting to the second exposure setting, obtaining, using the image sensor device, a second image captured using the image sensor device, the second image being captured under active illumination by at least one infrared, IR, illuminator associated with the eye tracking system; wherein the at least one IR illuminator is illuminated during an entire exposure time of the image sensor.

10. The system of claim 9, wherein the processing circuitry is configured to detect in the first image at least a part of an eye by detecting at least one glint caused by IR light from the at least one IR illuminator or at least one pupil illuminated by IR light from the at least one IR illuminator.

11. The system of claim 9, wherein the processing circuitry is configured to define a first region of interest, ROI, for a first eye depicted in the first image and a second region of interest, ROI, for a second eye depicted in the first image.

12. The system of claim 9, wherein the processing circuitry is configured to determine the respective intensity value for each of the at least one ROI by applying a histogram to the intensity values of all or a selection of the pixels in the ROI.

13. The system of claim 9, wherein the processing circuitry is configured to determine if at least one eye is depicted in a first image by detecting pixels representing a glint or at least a part of one or more of the iris, the pupil, the sclera, or the eye lid of the at least one eye.

14. The system of claim 9, wherein the at least one exposure parameter of the image sensor device comprises gain and wherein the processing circuitry is configured to adjust the at least one exposure parameter by applying a gain to be multiplied to the pixel intensity values of images captured using the image sensor device.

15. The system of claim 9, wherein the at least one exposure parameter of the image sensor device comprises exposure time and wherein the processing circuitry is configured to adjust the at least one exposure parameter by adjusting the exposure time to be applied when capturing images using the image sensor device.

16. The system of claim 9, wherein the at least one exposure parameter of the image sensor device comprises skipping or binning and wherein the processing circuitry is configured to adjust the at least one exposure parameter by adjusting a skipping or binning read-out scheme for the image sensor device.

17. The system of claim 9, wherein the processing circuitry is further configured to perform eye detection based on the second image, using the eye tracking system.

18. A non-transitory computer-readable storage medium storing instructions which, when executed by processing circuitry of a system, cause the system to:
    obtain a first image, wherein the first image is captured under active illumination by at least one infrared, IR, illuminator associated with the eye tracking system and at a current exposure setting, using the image sensor;
    determine if at least one eye is depicted in the first image, wherein determining if at least one eye is depicted in the first image comprises detecting in the first image at least a part of an eye illuminated by IR light from the at least one IR illuminator, wherein said at least one part of an eye comprises at least one glint, at least one pupil, a part of at least one iris, a part of at least one sclera, and/or a part of at least one eye lid;
    if at least one eye is depicted in the first image:
        define at least one region of interest, ROI, from the first image comprising a group of pixels in the first image representing at least a part of the depicted at least one eye;

determine a respective intensity value for each of the at least one ROI based on intensity values of the group of pixels in the ROI; and determine a second exposure setting by adjusting at least one exposure parameter of the image sensor device based on the determined intensity value, or values, for the at least one ROI; and set the current exposure setting to the second exposure setting;

wherein the instructions further cause the system to:

after setting the current exposure setting to the second exposure setting, obtain, using the image sensor device, a second image captured using the image sensor device, the second image being captured under active illumination by at least one infrared, IR, illuminator associated with the eye tracking system;

wherein the at least one IR illuminator is illuminated during an entire exposure time of the image sensor.

* * * * *